(12) United States Patent
Gould et al.

(10) Patent No.: US 11,052,863 B2
(45) Date of Patent: Jul. 6, 2021

(54) STITCHING FOR A PROTECTION DEVICE

(71) Applicant: TRW Vehicle Safety Systems Inc., Washington, MI (US)

(72) Inventors: Douglas M. Gould, Lake Orion, MI (US); Michael White, Ddryden, MI (US)

(73) Assignee: TRW VEHICLE SAFETY SYSTEMS INC., Washington, MI (US)

(*) Notice: Subject to any disclaimer, the term of this patent is extended or adjusted under 35 U.S.C. 154(b) by 160 days.

(21) Appl. No.: 16/387,886

(22) Filed: Apr. 18, 2019

(65) Prior Publication Data

US 2019/0322238 A1 Oct. 24, 2019

Related U.S. Application Data

(60) Provisional application No. 62/659,864, filed on Apr. 19, 2018.

(51) Int. Cl.
| | |
|---|---|
| *B60R 21/239* | (2006.01) |
| *B60R 21/235* | (2006.01) |
| *B60R 21/205* | (2011.01) |
| *B60R 21/00* | (2006.01) |

(52) U.S. Cl.
CPC .......... *B60R 21/239* (2013.01); *B60R 21/235* (2013.01); *B60R 21/205* (2013.01); *B60R 2021/0032* (2013.01); *B60R 2021/23504* (2013.01); *B60R 2021/23576* (2013.01)

(58) Field of Classification Search
CPC ................ B60R 21/239; B60R 21/276; B60R 2021/2395; B60R 2021/2765; B60R 2021/23576; B60R 2021/23538
See application file for complete search history.

(56) References Cited

U.S. PATENT DOCUMENTS

| | | | | |
|---|---|---|---|---|
| 9,834,168 | B2* | 12/2017 | Deng .................... | B60R 21/207 |
| 2003/0222446 | A1* | 12/2003 | Soderquist ............ | B60R 21/233 |
| | | | | 280/743.1 |
| 2008/0284147 | A1* | 11/2008 | Goto ..................... | B60R 21/239 |
| | | | | 280/736 |
| 2009/0224520 | A1* | 9/2009 | Higuchi ................ | B60R 21/239 |
| | | | | 280/740 |

(Continued)

*Primary Examiner* — James A English
(74) *Attorney, Agent, or Firm* — Tarolli, Sundheim, Covell & Tummino LLP (57) ABSTRACT

In one example, an apparatus for helping to protect an occupant of a vehicle includes an inflatable vehicle occupant protection device having a deflated condition and an inflated condition. The protection device includes a first panel having a centerline and first and second openings. A second panel is secured to the first panel to define an inflatable volume. First and second self-adaptive vents are secured to the first panel over the first and second openings on opposite sides of the centerline for selectively releasing inflation fluid from the inflatable volume in response to penetration of the occupant into the protection device. A first reinforcing stitching extends through the first panel and around a portion of the first self-adaptive vent. A second reinforcing stitching extends through the first panel and around a portion of the second self-adaptive vent. Each of the first and second reinforcing stitchings is spaced entirely from the respective first and second self-adaptive vents.

23 Claims, 9 Drawing Sheets

(56) References Cited

U.S. PATENT DOCUMENTS

| | | | |
|---|---|---|---|
| 2013/0234423 A1* | 9/2013 | Higuchi | B60R 21/239 |
| | | | 280/742 |
| 2014/0225354 A1* | 8/2014 | Williams | D05B 13/00 |
| | | | 280/743.1 |
| 2017/0197578 A1* | 7/2017 | Hatfield | B60R 21/239 |
| 2019/0308583 A1* | 10/2019 | Baba | B60R 21/203 |

* cited by examiner

STITCHING FOR A PROTECTION DEVICE

RELATED APPLICATION

This application claims the benefit of U.S. Provisional Application Ser. No. 62/659,864, filed on Apr. 19, 2018.

TECHNICAL FIELD

The present invention relates to an apparatus for helping to protect an occupant of a vehicle. More particularly, the present invention relates to an air bag inflatable between an instrument panel and a front seat occupant of a vehicle.

BACKGROUND

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY

In one example, an apparatus for helping to protect an occupant of a vehicle includes an inflatable vehicle occupant protection device having a deflated condition and an inflated condition. The protection device includes a first panel having a centerline and first and second openings. A second panel is secured to the first panel to define an inflatable volume. First and second self-adaptive vents are secured to the first panel over the first and second openings on opposite sides of the centerline for selectively releasing inflation fluid from the inflatable volume in response to penetration of the occupant into the protection device. A first reinforcing stitching extends through the first panel and around a portion of the first self-adaptive vent. A second reinforcing stitching extends through the first panel and around a portion of the second self-adaptive vent. Each of the first and second reinforcing stitchings is spaced entirely from the respective first and second self-adaptive vents.

In another example, an apparatus for helping to protect an occupant of a vehicle includes an inflatable vehicle occupant protection device having a deflated condition and an inflated condition. The protection device includes a first panel having a centerline and first and second vent openings. A reinforcing panel has a centerline and is secured to the first panel such that the centerlines of the reinforcing panel and the first panel are co-extensive. A second panel is secured to the first panel to define an inflatable volume. At least one of the first panel and the reinforcing panel have a weave pattern extending at an angle relative to the centerline of the first panel. First and second self-adaptive vents are secured to the first panel over the first and second openings on opposite sides of the centerline for selectively releasing inflation fluid from the inflatable volume in response to penetration of the occupant into the protection device. A first reinforcing stitching extends through the first panel and the reinforcing panel and around a portion of the first self-adaptive vent. A second reinforcing stitching extends through the first panel and the reinforcing panel and around a portion of the second self-adaptive vent. Each of the first and second reinforcing stitchings is spaced entirely from the respective first and second self-adaptive vents.

Other objects and advantages and a fuller understanding of the invention will be had from the following detailed description and the accompanying drawings.

DETAILED DESCRIPTION

The present invention relates to an apparatus for helping to protect an occupant of a vehicle. More particularly, the present invention relates to an air bag inflatable between an instrument panel and a front seat occupant of a vehicle.

An apparatus 10 for helping to protect an occupant 20 of a vehicle 12 includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of the vehicle 12.

The air bag 14 can be part of an air bag module 30 that includes an inflator 32 and a housing 34. The air bag 14 has a stored condition, indicated by dashed lines in FIGS. 1 and 2, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIGS. 1 and 2 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

Figure 1:
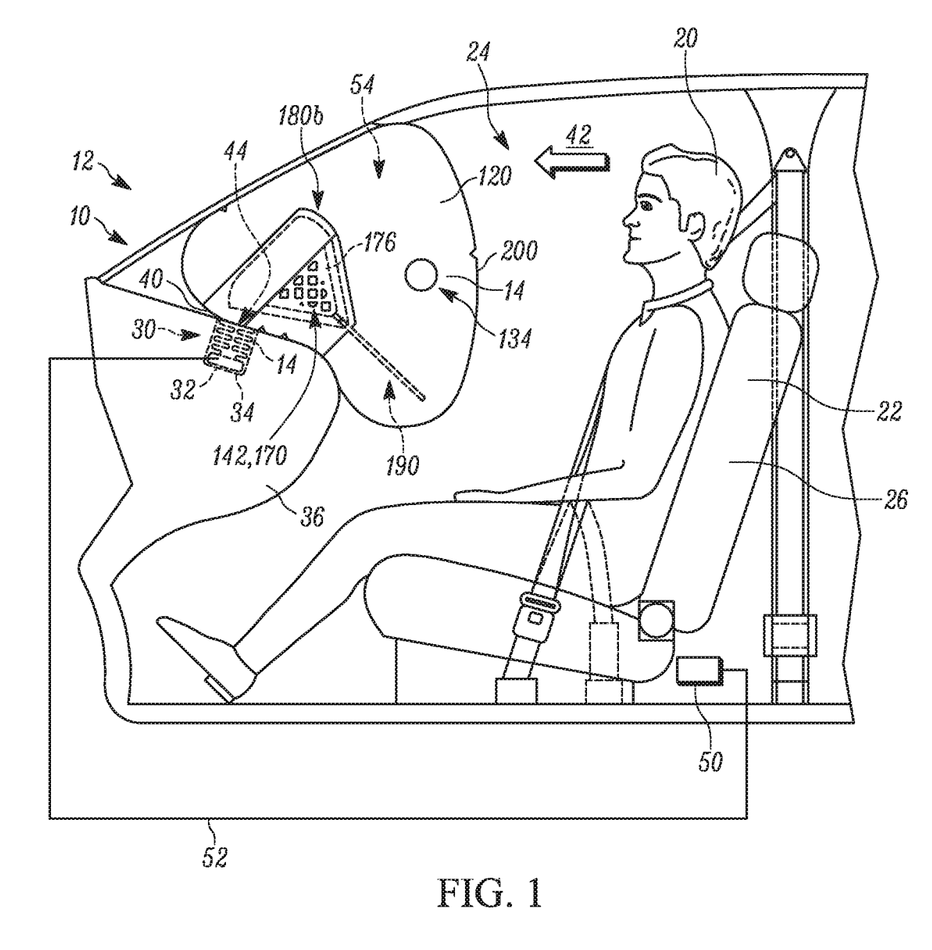
FIG. 1 is a schematic side view illustrating an example apparatus for helping to protect an occupant of a vehicle with the occupant being in a first position invention.
Figure 2:
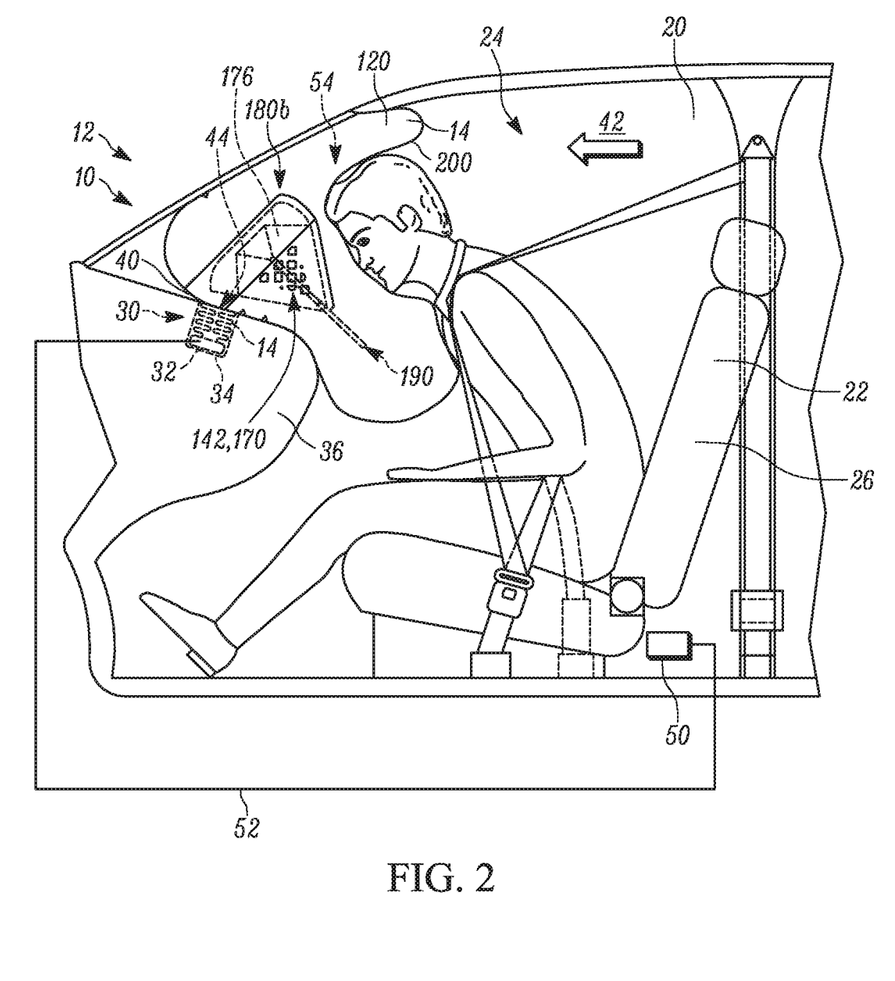
FIG. 2 is a schematic illustration of the apparatus of FIG. 1 with the vehicle occupant in a second position.

The inflator 32 is actuatable to provide inflation fluid for inflating the air bag 14. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon, e.g., woven nylon 6-6 yarns, and may be constructed in any suitable manner. For example, the air bag 14 may include one or more pieces or panels of material that are interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Figure 3:
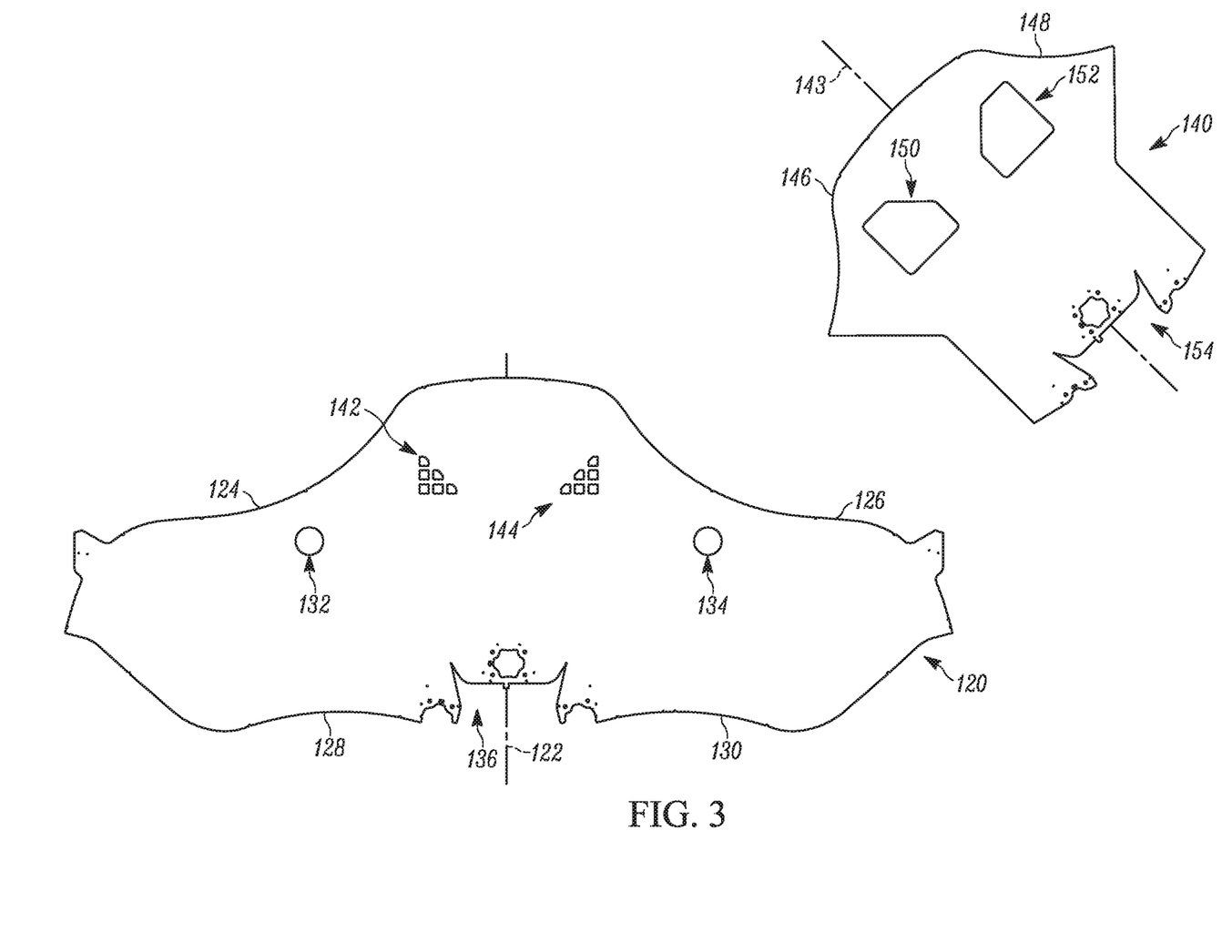
FIG. 3 is a top view of portions of the apparatus of FIG. 1.

FIGS. 3-6 illustrate by way of example one particular construction of the air bag 14 of FIGS. 1 and 2. Referring to FIG. 3, the air bag 14 includes a center or main panel 120 and an optional reinforcing panel 140. The main panel 120 extends along a centerline 122 and includes first and second longitudinal edge portions 124, 126 extending along the top side (as shown) on opposite sides of the centerline. Third and fourth longitudinal edge portions 128, 130 extend from the first and second longitudinal edge portions 124, 126, respectively, along the bottom side (as shown) of the main panel 120 to the centerline 122.

The longitudinal edge portions 124, 126, 128, 130 cooperate to define curved first and second side portions of the main panel 120 having curved and contoured configurations that help define the profile of the air bag 14, as shown in FIG. 1. The longitudinal edge portions 124, 126, 128, 130 thus help define the inflated configuration, e.g., shape and depth, of the air bag 14, such as a shape and contour that follows the contour of the instrument panel 36 of the vehicle 12 (see FIG. 1). Those skilled in the art will appreciate that the desired inflated configuration of the air bag 14 can vary among different vehicle models, depending on factors, such as available space in the passenger compartment and the architecture of the vehicle.

The main panel 120 includes an opening 136 for receiving inflation fluid for inflating the air bag 14. The main panel 120 also includes apertures for receiving fasteners (not shown) for connecting the air bag 14 to other components of the air bag module 30, e.g., to the housing 34.

First and second ride-down openings 132, 134 are formed in the main panel 120 on opposite sides of the centerline 122. One or more first vent openings 142 are formed in the main panel 120 between the first ride-down opening 132 and the centerline 122. One or more second vent openings 144 are formed in the main panel 120 between the second ride-down opening 134 and the centerline 122. The shape, number, and arrangement of the vent openings 142 can be the same as the shape, number, and arrangement of the vent openings 144. The ride-down openings 132, 134 and vent openings 142, 144 are symmetrically arranged about the centerline 122.

The reinforcing panel 140 extends along a centerline 143 and includes first and second longitudinal edge portions 146, 148 extending along the left and right sides (as shown), respectively, on opposite sides of the centerline. An opening 154 is formed in the reinforcing panel 140 for receiving inflation fluid to inflate the air bag 14. The opening 154 in the reinforcement panel 140 corresponds with the opening 136 in the main panel 120.

The reinforcing panel 140 also includes apertures for receiving fasteners (not shown) for connecting the air bag 14 to other components of the air bag module 30, e.g., to the housing 34. When the air bag 14 is connected to the housing 34 of the air bag module 30, the openings 136, 154 provide fluid communication between the housing 34 and an inflatable volume 54 of the air bag.

First and second vent openings 150, 152 are formed in the reinforcing panel 140 on opposite sides of the centerline 143. The first and second vent openings 150, 152 in the reinforcing panel 140 correspond with the first and second openings 142, 144, respectively, in the main panel 120. Each vent opening 150, 152 in the reinforcing panel 140 is configured to be larger than its corresponding vent opening 142 and 144 in the main panel 120.

Figure 4:
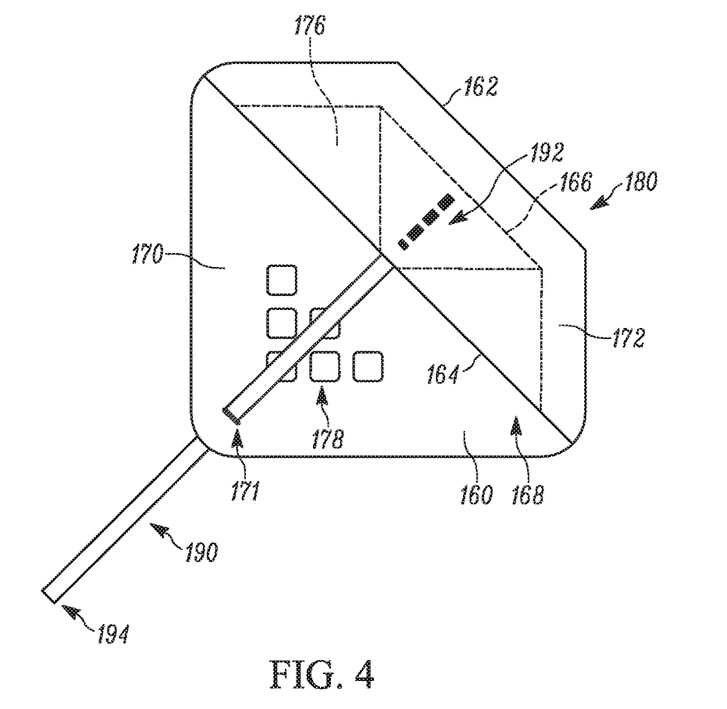
FIG. 4 is a top view of a vent panel and tether of the apparatus of FIG. 1.

Referring to FIG. 4, the air bag 14 further includes one or more door panels 160 and a vent tether 190 associated with each door panel 160. Each door panel 160 includes a base portion 170, a reinforcing portion 172 delimited from the base portion by a first fold line 162, and a door portion 176 delimited from the reinforcing portion by a second fold line 164. The base portion 170 includes one or more vent openings 176 that correspond in shape, number, and arrangement to the vent openings 142, 144 in the main panel 120.

The door panel 160 is placed in an initial condition illustrated in FIG. 4 by folding the door portion 176 along a third fold line 166 into a pocket 168 formed by the reinforcing portion 172. The door portion 126 is maintained in this position by securing it to the reinforcing portion 172, e.g., by releasable stitching, such that the vent openings 178 are uncovered. The vent tether 190 extends through a slot 171 in the base portion 170. A first end portion 192 of the vent tether 190 is secured to the folded door portion 176. A second end 194 of the tether 190 extends away from the door panel 160.

Figure 5:
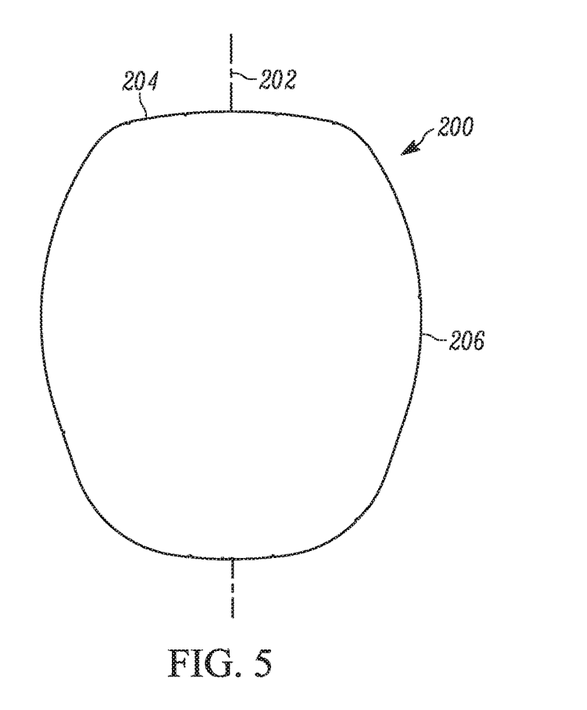
FIG. 5 is a front view of another portion of the apparatus of FIG. 1.

Referring to FIG. 5, the air bag 14 further includes a front panel 200. The front panel 200 extends along a centerline 202. First and second longitudinal edge portions 204, 206 extend along the left and right sides (as shown), respectively, on opposite sides of the centerline 202.

Figure 6:
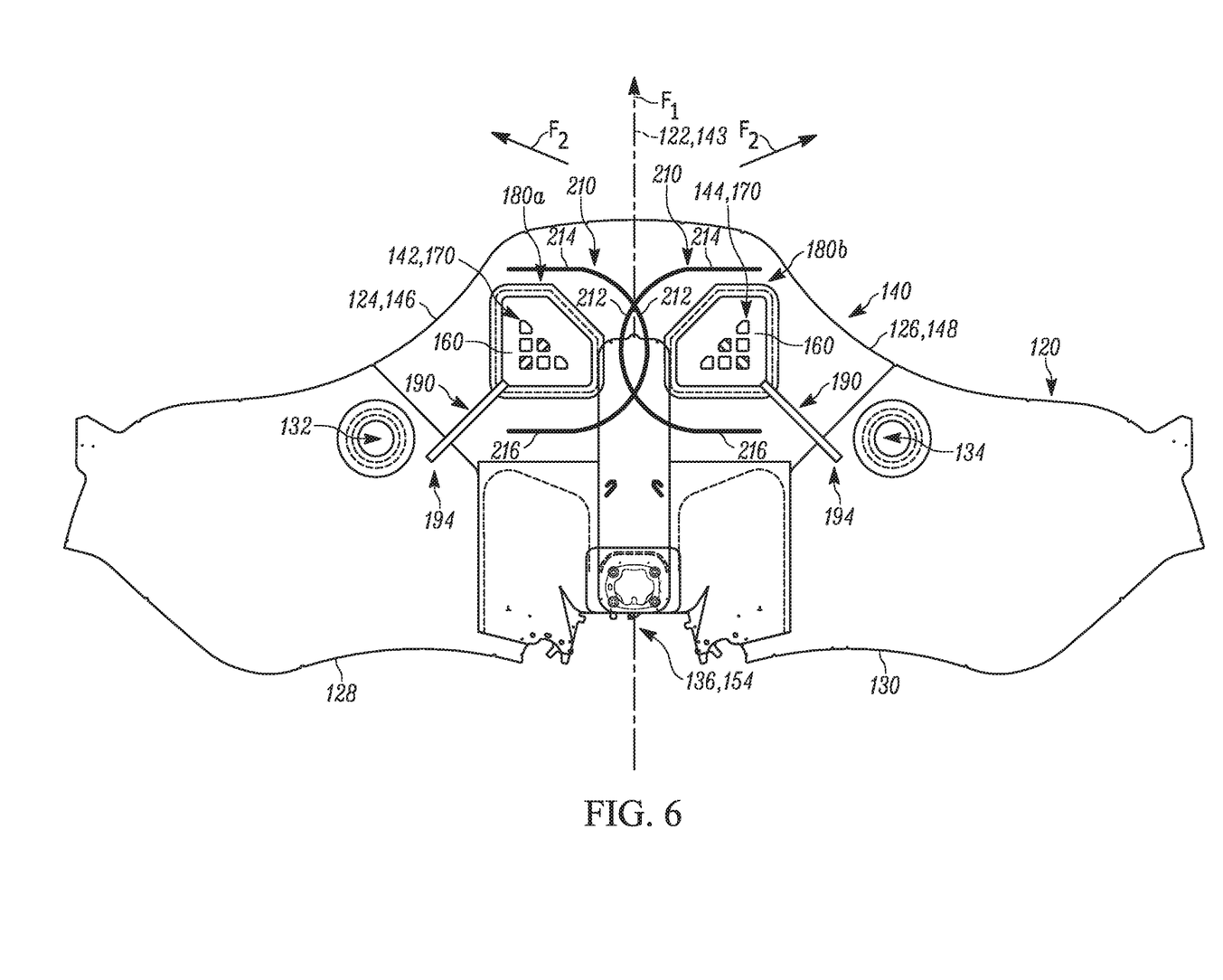
FIG. 6 is a schematic illustration of the apparatus of FIG. 1 during assembly thereof.

To assemble the air bag 14, the reinforcing panel 140 is secured to the main panel 120. As shown in FIG. 6, the reinforcing panel 140 is oriented on the main panel 120 such that the centerlines 122, 143 are aligned with one another, the openings 136, 154 are aligned with one another, the vent openings 142, 150 are aligned with one another, and the vent openings 144, 152 are aligned with one another. Consequently, the vent openings 142 are exposed through the vent opening 150. The vent openings 144 are exposed through the vent opening 152. The first and second longitudinal edge portions 146, 148 of the reinforcing panel 140 are secured to the main panel 120—including along the longitudinal edge portions 124, 126—by means, such as stitching, ultrasonic welding, heat bonding, and/or adhesives.

The door panels 160 are secured along their entire perimeter to the reinforcing panel 140 and the main panel 120 by means, such as stitching, ultrasonic welding, heat bonding, adhesives, or a combination thereof. The door panels 160 are positioned such that the folded-over reinforcing portion 172 and door portion 176 of each door panel is sandwiched between the corresponding base portion 170 and the reinforcing panel 140. The reinforcing panel 140 and/or door panels 160 can include notches for helping properly align the door panels on the main panel. It will be appreciated that when the reinforcing panel 140 is omitted the door panels 160 are secured directly to the main panel 120, which can include alignment structure for locating the door panel thereon.

When the door panels 160 are secured to the panels 120, 140 as shown in FIG. 6, the vent openings 142 in the main panel align with the vent openings 170 in one door panel. The vent openings 144 align with the vent openings 170 in the other door panel 160. The vent openings 142 in the main panel 120, one of the door panels 160, and one of the tethers 190 cooperate to define a self-adaptive vent 180a. The vent openings 144, the other door panel 160, and the other tether 190 cooperate to define a self-adaptive vent 180b. Both self-adaptive vents 180a, 180b selectively release inflation fluid from the inflatable volume 54 of the air bag 14.

The second end portion 194 of each vent tether 190 is secured to the main panel 120 by, for example, stitching such that the vent tether is drawn taught. As shown, the vents 180a, 180b are symmetrically arranged about the centerline 122 of the main panel 120. A V-shaped stitch (not shown) can connect the door portion 176 of each vent 180a, 180b to the reinforcing panel 140 and main panel 120.

Figure 7A:
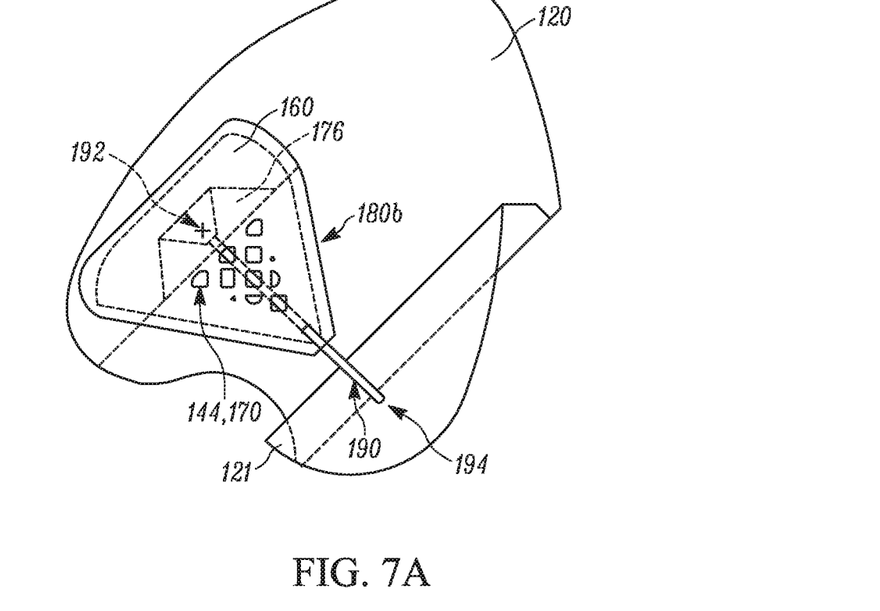
FIGS. 7A-7B are plan views illustrating vents of the protection device assembled and in different conditions.
Figure 7B:
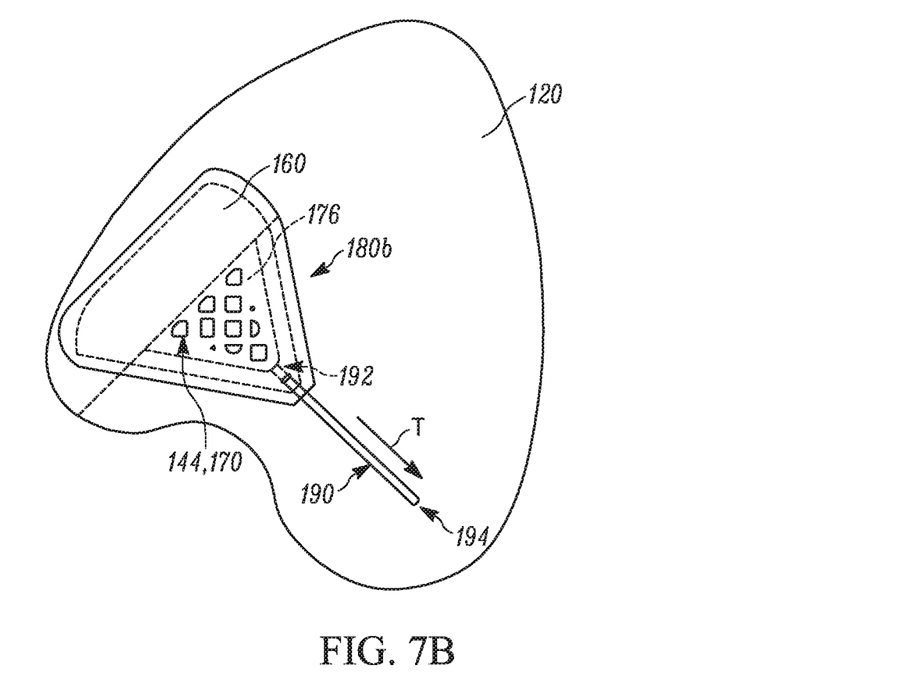

FIGS. 7A-7B illustrate one of the vents 180b in an open condition (FIG. 7A) and a closed condition (FIG. 7B). It will be appreciated that the vent 180a will have the same conditions. In the open condition of FIG. 7A, the door portion 176 remains folded and secured to the reinforcing portion 172, leaving the aligned vent openings 144 and 170 of the main panel 120 and door panel 160 uncovered. The second end portion 194 of the tether 190 can be secured to a folded portion 121 of the main panel 120 when the vent 180b is in the open condition.

In the closed condition of FIG. 7B, the door portion 176 is released from the reinforcing portion 172 and allowed to unfold across and cover or close the aligned vent openings 144 and 170. The door portion 176 is actuated from the open condition to the closed condition through tension on the vent tether 190—indicated generally at T in FIG. 7B. The tension T ruptures or otherwise breaks the means securing the door portion 176 to the main panel 120, thereby releasing the door portion to unfold and cover the vent openings 144 and 170.

In accordance with the present invention, at least one reinforcing stitching 210 (FIG. 6) is provided on the air bag 14. In one example, a pair of reinforcing stitchings 210 extends between the vents 180a, 180b and through the main panel 120 and—when present—through the reinforcing panel 140. The reinforcing stitchings 210 can have any shape, e.g., C-shaped as shown, and can overlap one another (as shown) or be spaced from one another (not shown). The reinforcing stitchings 210 are symmetrically positioned about the centerline 122, 143 of the panels 120, 140 and face opposite directions. It will be appreciated that the reinforcing stitchings 210 can be formed separately and overlap one another in the air bag 14 or be integrally formed in one continuous process in which one reinforcing stitching is indistinguishable from the other. In the latter case, each reinforcing stitching 210 forms a portion of a single, unitary stitching configuration.

Each reinforcing stitching 210 includes a curved portion 212 and a pair of linear portions 214, 216 connected to each end of the curved portion. The linear portions 214, 216 cooperate to form an open end of the reinforcing stitching 210. The curved portion 212 forms a closed end of the reinforcing stitching 210. The linear portions 214, 216 extend along opposite sides of each vent 180a, 180b. The linear portions 214, 216 are substantially identical and extend toward the longitudinal edge portions 124, 126 of the main panel 120. The linear portions 214, 216 can extend longitudinally past the vents 180a, 180b or terminate somewhere along the sides of the vent. The linear portions 214, 216 of each reinforcing stitching 210 can extend parallel to one another (as shown) or extend at an angle relative to one another (not shown).

After the reinforcing stitchings 210 are formed, the main panel 120 is folded over the centerline 122 and the third and fourth longitudinal edge portions 128, 130 interconnected. The front panel 200 is secured to the periphery of the main panel to close the air bag 14. More specifically, the first and second longitudinal edge portions 204, 206 of the front panel 200 are secured to the first and second longitudinal edge portions 124, 126 of the main panel 120 and the first and second longitudinal edge portions 146, 148 of the reinforcing panel 140 by stitching, welding, etc. to form the air bag 14 profile shown in FIG. 1. The main panel 120 and front panel 200, when connected, help define the inflatable volume 54 of the air bag 14.

Referring to FIGS. 1-2, upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition illustrated in solid lines in FIGS. 1 and 2. The air bag 14, while inflated, helps protect the vehicle occupant 20 from impacts with parts of the vehicle 12, such as the instrument panel 36.

When an event for which inflation of the air bag 14 occurs, the occupant 20 moves in the forward direction indicated by the arrow labeled 42 in FIGS. 1 and 2 into engagement with the air bag 14. In FIG. 1, the occupant 20 is shown in a normally seated position, generally upright and positioned against a backrest portion 26 of the seat 22. As a result, the air bag 14 inflates and deploys to a normally inflated position shown in FIG. 1.

In FIG. 2, the occupant 20 is positioned away from the normally seated position. More particularly, in FIG. 2, the occupant 20 is leaned forward from the normally seated position of FIG. 1. As a result, as shown in FIG. 2, the occupant 20 may block or otherwise impede the air bag 14 from inflating to the normally inflated position.

The ride-down openings 132, 134 provide constant venting of the air bag 14 regardless of whether the occupant 20 is in the normally seated position (FIG. 1) or positioned away from the normally seated position (FIG. 2) when the air bag 14 is inflated. The ride-down openings 132, 134 therefore vent inflation fluid from the inflatable volume 54 of the air bag 14 throughout the duration of the event for which inflation of the air bag is desired. The ride-down openings 132, 134 can thereby help provide desired ridedown characteristics of the air bag 14.

On the other hand, the self-adapting vents 180a, 180b adapt based on the position of the occupant 20 upon the occurrence of the event for which inflation of the air bag 14 is desired. Prior to such an event, the vents 180a, 180b are in the open condition (FIG. 7A) while stored in the air bag module 30.

If, upon the occurrence of the event, the occupant 20 is in the normally seated position of FIG. 1, the air bag 14 inflates to the normally deployed condition. As this occurs, the main panel 120 expands toward the normally deployed condition of FIGS. 1 and 7B. Consequently, the folded portions 121 of the main panel 120 extend, which tensions the vent tethers 190 to thereby apply a pulling force on each door portion 176 of the respective door panel 160. The force applied to the door portions 176 breaks or otherwise ruptures the tear stitching and moves the door portions to the closed condition of FIGS. 1 and 7B. The door portions 176 block inflation fluid flow through the vent openings 142,170 of the vent 180a and the vent openings 144, 170 of the vent 180b. This allows the air bag 14 to inflate to the normally deployed and pressurized condition of FIG. 1.

If, upon the occurrence of the event, the occupant 20 is positioned away from the normally seated position (FIG. 2), the air bag 14 can be impeded from inflating to the normally deployed condition. As a result, the main panel 120 does not move to the normally deployed condition, i.e., the folded portions 121 do not fully or adequately extend/unfold sufficient to tension the vent tethers 190. Consequently, the door portions 176 do not move to positions covering the vent openings 142, 170 of the vent 180a or the vent openings 144, 170 of the vent 180b and, thus, the vents remain in the open condition of FIGS. 2 and 7A. This allows inflation fluid to flow through the vent openings 142, 170 of the vent 180a and the vent openings 144, 170 of the vent 180b to enable the occupant 20 to ride down the air bag 14 in the forward direction 42 in a controlled manner.

Regardless of the position of the occupant 20, the forces acting on the air bag 14 during inflation and deployment are indicated generally by the arrows $F_1$ and $F_2$ in FIG. 6. The arrow $F_1$ indicates forces generally (as shown) in the vertical direction whereas the arrows $F_2$ indicate forces generally in the horizontal direction.

The curved portions 212 of the reinforcing stitchings 210 are generally aligned with the deployment forces $F_1$. The linear portions 124, 126 of the reinforcing stitchings 210 are generally aligned with the deployment forces $F_2$. Consequently, the reinforcing stitchings 210 help to distribute/spread the load on the air bag 14 out in multiple directions. Moreover, the radius of curvature of each curved portion 212 is relatively large. Both of these characteristics help to mitigate/eliminate tearing of the reinforcing stitchings 210 during deployment.

Figure 8:
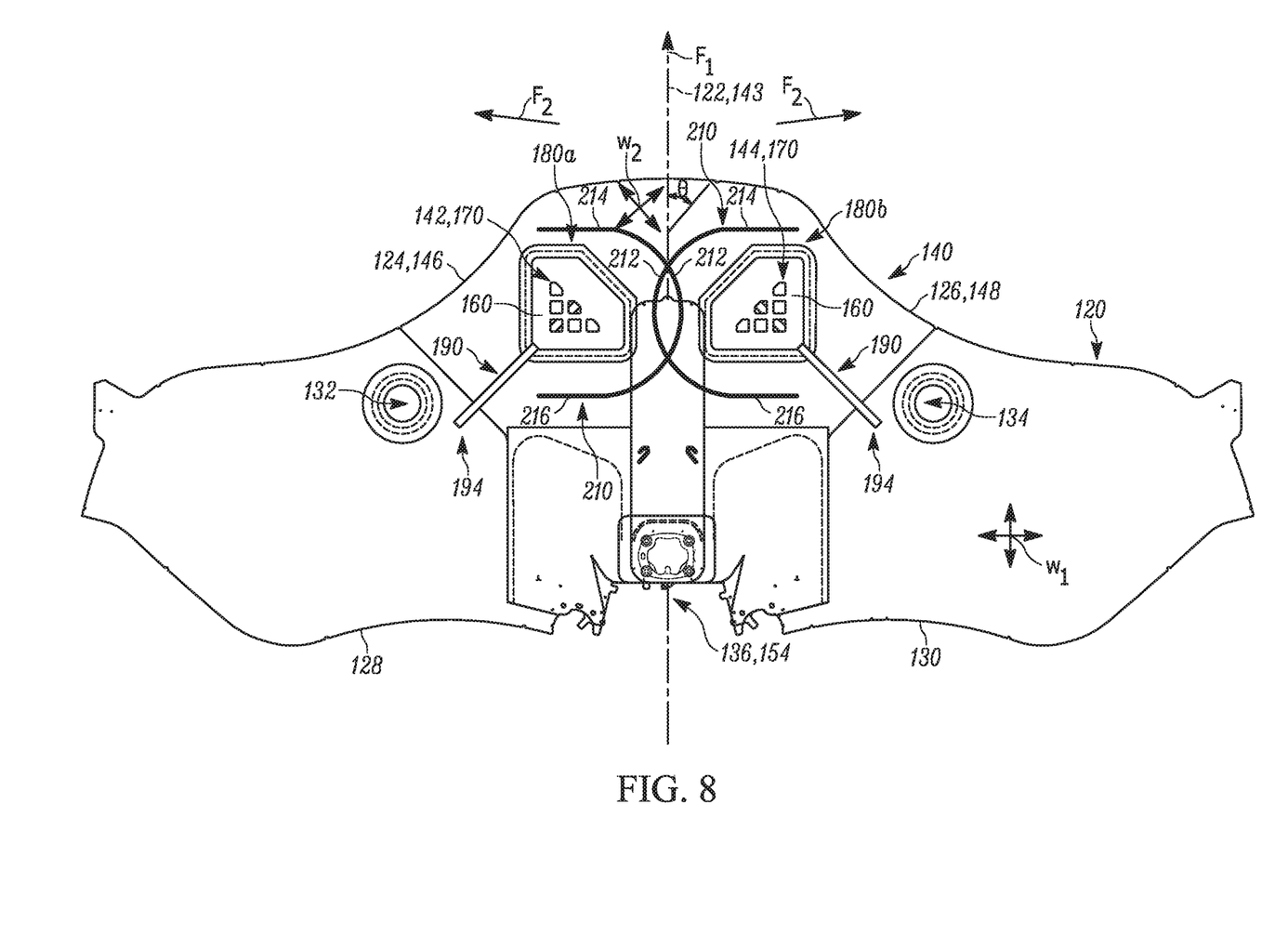
FIG. 8 is a schematic illustration of the apparatus of FIG. 1 with an alternative construction.

FIG. 8 illustrates another example configuration of the air bag 14 in which portions of the air bag have a weave pattern specifically oriented based on the deployment forces $F_1$, $F_2$. At least one of the main panel 120 and the reinforcing panel 140 is cut at an angle θ relative to the centerlines 122, 143. In one example, the angle θ is about a 22° weave bias.

By weave bias, it is meant that the air bag panels 120, 140 are cut from a sheet of air bag fabric material such that the centerlines 122, 143 extend at the angle θ relative to the weave direction of the material. The angle θ is measured relative to the warp direction of the air bag fabric material, which typically runs longitudinal or lengthwise, as measured in the direction in which the material is rolled. Due to this construction, the forces $F_1$, $F_2$ acting on the air bag 14 can be made to be oblique to the warp/weft direction of the fabric, in order to help minimize the degree to which neither the warp yarns nor weft yarns are tensioned in certain regions of the air bag. This also helps reduce friction on the unfolding air bag 14, thereby reducing the likelihood of tear at, for example, the area of the vents 180.

Figure 9A:
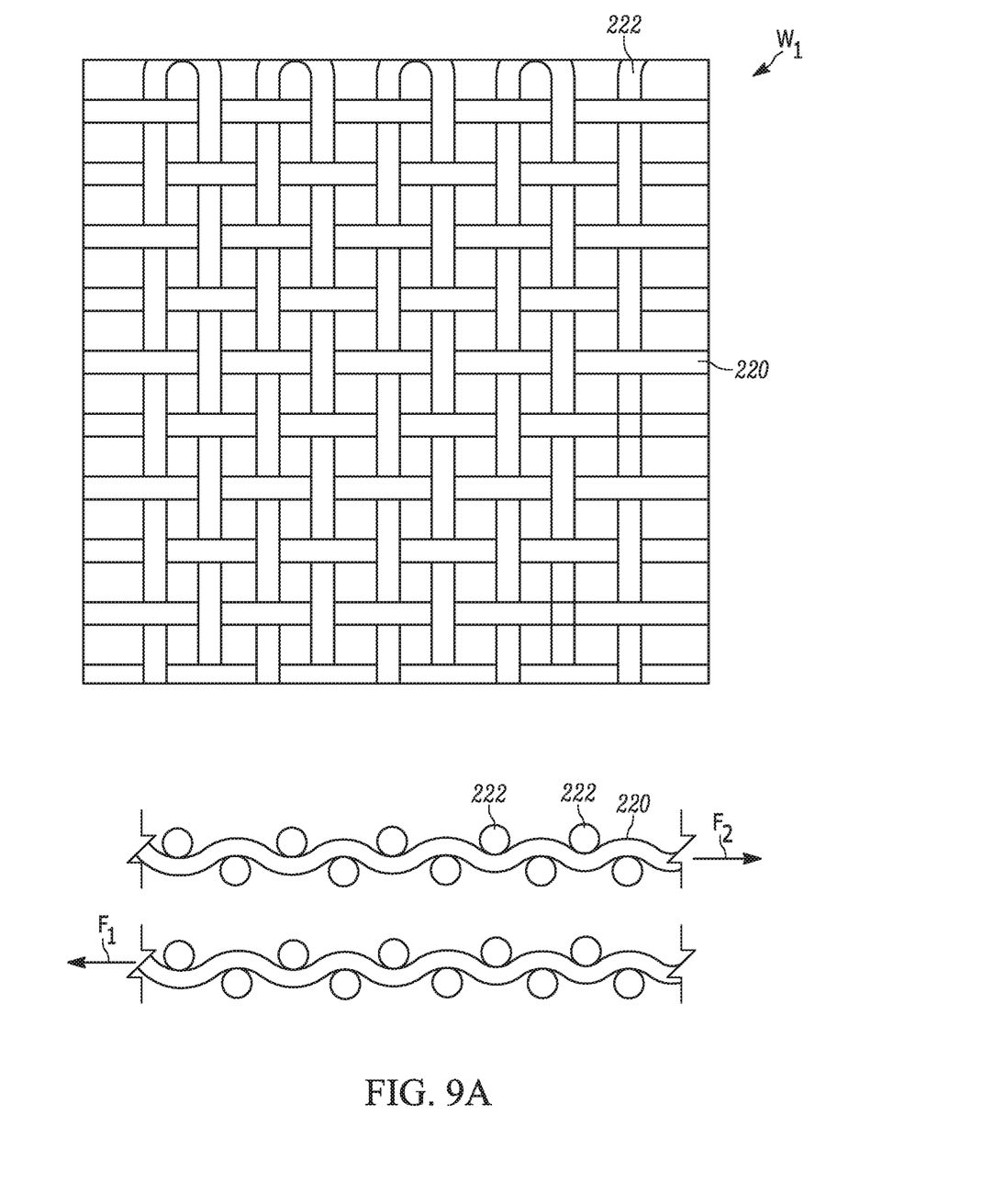
FIG. 9A is a schematic illustration of a first weave pattern for the apparatus of FIG. 1.
Figure 9B:
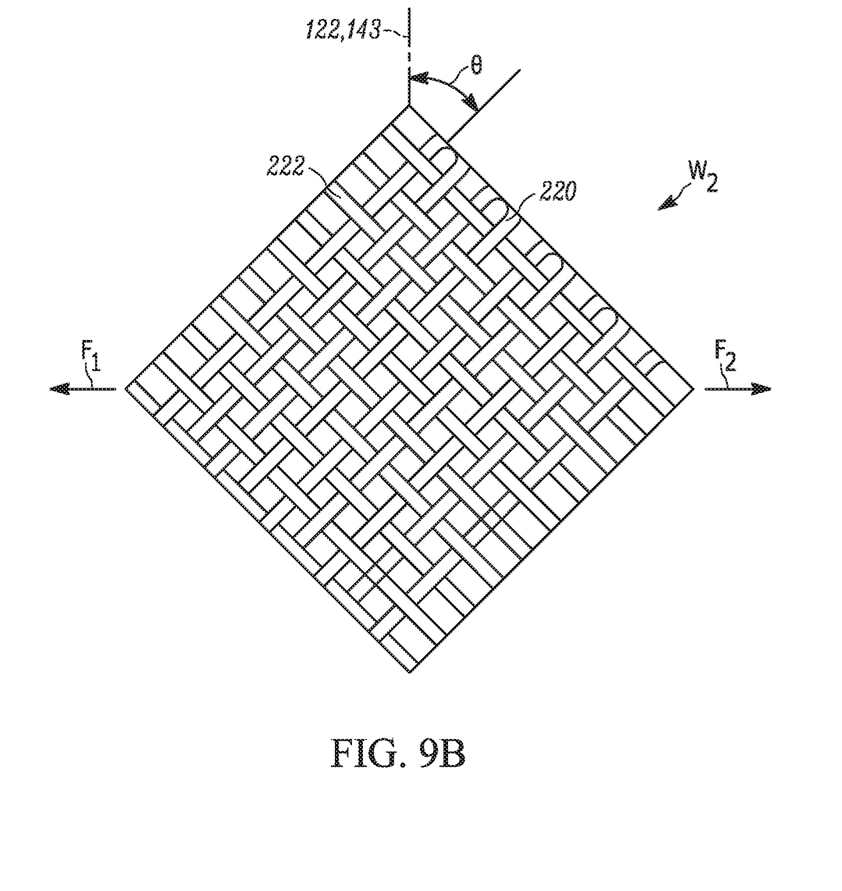
FIG. 9B is a schematic illustration of a second weave pattern for the apparatus of FIG. 1.

FIGS. 9A-9B show different weave patterns $w_1$, $w_2$ illustrating how the angle θ affects tension/friction on the air bag 14 fabric. Referring to FIG. 9A, the weave pattern $w_1$ has no angle θ and, thus, the warp yarns 220 extend generally parallel to the deployment forces $F_2$. The weft yarns 222 extend generally parallel to the deployment force. $F_1$. As a result, pulling the warp yarns 220 in opposite directions in response to the deployment forces $F_2$ causes the rows of yarns 220, 222 to rub against one another. More specifically, the peaks and valleys of the intersecting warp and weft yarns 220, 222 are aligned with one another and move relative to/abrade across one another, thereby causing friction and heat that can weaken the air bag 14 fabric.

On other hand, in FIG. 9B the fabric is cut such that the weave pattern $w_2$ has the weave bias angle θ, which misaligns the warp and weft yarns 220, 222 from the deployment forces $F_1$, $F_2$. In other words, the deployment forces $F_1$, $F_2$ act in directions that are angled relative to the warp and weft yarns 220, 222. Due to the weave bias, the peaks and valleys of the warp and weft yarns 220, 222 are not aligned with one another. Consequently, when the intersecting warp and weft yarns 220, 222 move relative to one another the yarns slip across each other compared to when the yarns are aligned with the deployment forces $F_1$, $F_2$. This slipping causes less friction, heat, and tearing likelihood and thereby helps the fabric maintain its integrity during inflation and deployment of the air bag 14.

The reinforcing stitchings of the present invention are advantageous because it helps reduce the likelihood that the main panel and/or reinforcing panel tears during deployment of the air bag. To this end, the reinforcing stitchings add additional strength and structure to the air bag, e.g., to the area between the vents along the centerline of the main panel as well as to the area between the vent openings in the main and door panels, without requiring additional panels or complexity. More specifically, the reinforcing stitchings combine the main panel and reinforcement panel together, which results in the deployment forces being distributed between the two panels collectively instead of independently upon each panel. The combined panels are therefore advantageously able to withstand the deployment loads near the vents compared to the individual panels.

Moreover, as shown in FIG. 8, the reinforcing stitchings advantageously can have a sewing pattern in line with the deployment forces $F_1$, $F_2$. To this end, the linear portions can extend in directions aligned with the deployment forces $F_2$ while the curved portions can extend in a direction generally aligned with the deployment force $F_1$. This is true regardless of which weave pattern $w_1$, $w_2$ is used to form the air bag. The curved portions of the reinforcing stitchings can also have a large radius that moves from one load direction $F_1$, $F_2$ to the other.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for helping to protect an occupant of a vehicle, the apparatus comprising:
an inflatable vehicle occupant protection device having a deflated condition and an inflated condition, the protection device comprising a first panel having a centerline and first and second vent openings;
a second panel secured to the first panel to define an inflatable volume;
first and second self-adaptive vents secured to the first panel over the first and second vent openings on opposite sides of the centerline for selectively releasing inflation fluid from the inflatable volume in response to a penetration of the occupant into the protection device;
a first reinforcing stitching extending through the first panel and around a portion of the first self-adaptive vent; and
a second reinforcing stitching extending through the first panel and around a portion of the second self-adaptive vent, each of the first and second reinforcing stitching extending entirely outside perimeters of the respective first and second self-adaptive vents.

2. The apparatus recited in claim 1, wherein the first and second reinforcing stitchings are C-shaped.

3. The apparatus recited in claim 1, wherein the first and second reinforcing stitchings are symmetrically arranged about the centerline of the first panel.

4. The apparatus recited in claim 1, wherein the first and second reinforcing stitchings cross the centerline of the first panel.

5. The apparatus recited in claim 1, wherein the first reinforcing stitching comprises a pair of linear portions extending to opposite sides of the first self-adaptive vent and a curved portion interconnecting the linear portions.

6. The apparatus recited in claim 5, wherein the second reinforcing stitching comprises a pair of linear portions extending to opposite sides of the second self-adaptive vent and a curved portion interconnecting the linear portions.

7. The apparatus recited in claim 1, wherein the first and second reinforcing stitchings are integrally formed with one another.

8. The apparatus recited in claim 1, wherein the first and second reinforcing stitchings are formed separately and overlap one another.

9. The apparatus recited in claim 1, further comprising a reinforcing panel secured to the first panel along the centerline, the first and second reinforcing stitchings extending through the reinforcing panel.

10. The apparatus recited in claim 9, wherein the reinforcing panel has a weave pattern extending at an angle relative to the centerline.

11. The apparatus recited in claim 10, wherein the angle is about 22°.

12. The apparatus recited in claim 1, wherein the first and second reinforcing stitchings are generally C-shaped, with open ends facing opposite each other and closed ends that intersect each other.

13. An apparatus for helping to protect an occupant of a vehicle, the apparatus comprising:
an inflatable vehicle occupant protection device having a deflated condition and an inflated condition, the protection device comprising a first panel having a centerline and first and second vent openings;
a reinforcing panel having a centerline and being secured to the first panel such that the centerlines of the reinforcing panel and the first panel are co-extensive;
a second panel secured to the first panel to define an inflatable volume, at least one of the first panel and the reinforcing panel having a weave pattern extending at an angle relative to the centerline of the first panel;
first and second self-adaptive vents secured to the first panel over the first and second openings on opposite sides of the centerline for selectively releasing inflation fluid from the inflatable volume in response to penetration of the occupant into the protection device;
a first reinforcing stitching extending through the first panel and the reinforcing panel and around a portion of the first self-adaptive vent; and
a second reinforcing stitching extending through the first panel and the reinforcing panel and around a portion of the second self-adaptive vent, each of the first and second reinforcing stitchings being spaced entirely from the respective first and second self-adaptive vents.

14. The apparatus recited in claim 13, wherein the first and second reinforcing stitchings are C-shaped.

15. The apparatus recited in claim 13, wherein the first and second reinforcing stitchings are symmetrically arranged about the centerline of the first panel and the centerline of the reinforcing panel.

16. The apparatus recited in claim 13, wherein the first and second reinforcing stitchings cross the centerline of the first panel and the centerline of the reinforcing panel.

17. The apparatus recited in claim 13, wherein the first and second reinforcing stitchings are generally C-shaped, with open ends facing opposite each other and closed ends that intersect each other.

18. The apparatus recited in claim 13, wherein the first reinforcing stitching comprises a pair of linear portions extending to opposite sides of the first self-adaptive vent and a curved portion interconnecting the linear portions.

19. The apparatus recited in claim 18, wherein the second reinforcing stitching comprises a pair of linear portions extending to opposite sides of the second self-adaptive vent and a curved portion interconnecting the linear portions.

20. The apparatus recited in claim 18, wherein the first and second reinforcing stitchings are integrally formed with one another.

21. The apparatus recited in claim 18, wherein the first and second reinforcing stitchings are formed separately and overlap one another.

22. The apparatus recited in claim 13, wherein the angle is about 22°.

23. The apparatus recited in claim 13, wherein the reinforcing panel includes openings corresponding with the first and second openings in the first panel.

* * * * *